United States Patent
Kato et al.

(10) Patent No.: US 7,892,463 B2
(45) Date of Patent: *Feb. 22, 2011

(54) MOLD CLAMPING FORCE CORRECTION METHOD FOR MOLD CLAMPING APPARATUS

(75) Inventors: Toshimi Kato, Nagano-ken (JP); Takashi Hakoda, Nagano-ken (JP)

(73) Assignee: Nissei Plastic Industrial Co., Ltd., Nagano-Ken (JP)

( * ) Notice: Subject to any disclaimer, the term of this patent is extended or adjusted under 35 U.S.C. 154(b) by 684 days.

This patent is subject to a terminal disclaimer.

(21) Appl. No.: 11/362,748

(22) Filed: Feb. 28, 2006

(65) Prior Publication Data

US 2006/0197248 A1 Sep. 7, 2006

(30) Foreign Application Priority Data

Mar. 1, 2005 (JP) .............................. 2005-056025

(51) Int. Cl.
 B29C 45/80 (2006.01)
 B29C 45/56 (2006.01)
(52) U.S. Cl. .................................. 264/40.5; 264/328.1
(58) Field of Classification Search .................. 264/40.5
 See application file for complete search history.

(56) References Cited

U.S. PATENT DOCUMENTS

| 7,132,069 B2 * | 11/2006 | Hakoda et al. | 264/40.1 |
| 7,244,378 B2 * | 7/2007 | Haruo et al. | 264/40.1 |
| 2005/0098912 A1 * | 5/2005 | Haruo et al. | 264/40.1 |

FOREIGN PATENT DOCUMENTS

JP 6-61806 B2 8/1994

* cited by examiner

*Primary Examiner*—Yogendra N Gupta
*Assistant Examiner*—Robert J Grun
(74) *Attorney, Agent, or Firm*—Birch Stewart Kolasch & Birch, LLP (57) ABSTRACT

When variation of mold clamping force to a mold C in production is detected and the mold clamping force is corrected on the basis of the detected variation, a work load accompanying high-pressure mold clamping of a mold clamping process is used as the variation, a work load as standard (standard work load Ws) accompanying high-pressure mold clamping is preset, the work load accompanying high-pressure mold clamping of the mold clamping process (detection work load Wd) is detected as variation in production, and the mold clamping force is corrected on the basis of a deviation Ke of standard work load Ws from this detection work load Wd.

8 Claims, 8 Drawing Sheets

MOLD CLAMPING FORCE CORRECTION METHOD FOR MOLD CLAMPING APPARATUS

BACKGROUND OF THE INVENTION

1. Field of the Invention

The present invention relates to a mold clamping force correction method for a mold clamping apparatus which detects variation in the mold clamping force during production and corrects the mold clamping force on the basis of the variation.

2. Description of the Relevant Art

Japanese Patent No. H6-61806 (1994) discloses a toggle-type mold clamping apparatus for clamping a mold provided in an injection molding machine. As disclosed, the toggle-type mold clamping apparatus connects a movable platen supporting a movable mold and a crosshead advanced and retracted by a drive unit with a toggle link mechanism, has the function of increasing the pressing force of the crosshead and transmitting it to the movable platen, generating a predetermined mold clamping force based on the extension of the tie bars in a state in which the toggle link mechanism is almost fully extended. In the mold closing operation, high-velocity mold closure is usually performed from a mold open position and, if the mold reaches a low-velocity low-pressure changeover position, the operation mode is switched to low-velocity low-pressure mold closing. The low-velocity low-pressure mold closure becomes the mold protection zone, from which a molded product that is not properly ejected is detected as a foreign object. If the mold reaches a preset high-pressure changeover position, the operation mode is switched to perform high-pressure mold clamping.

The toggle-type mold clamping apparatus differs from a direct-pressure type clamping apparatus by the mold clamping principle, and the mold clamping force greatly varies even when the mold and tie bars expand and contract only slightly due to foreign disturbance factors, such as the heating temperature of the mold and the outside air temperature, etc. In particular, it causes significant problems, such as quality deterioration, etc. when forming a precise molded product. More specifically, the mold clamping force increases due to the thermal expansion of the mold after heating, even when a regular mold clamping force (target value) is established before heating the mold. Heat is then transmitted from the mold to the tie bars, and the tie bars thermally expand to slowly reduce the mold clamping force when heating the mold or thereafter. Moreover, the thermal expansion of mold becomes a primary factor for increasing the mold clamping force and the thermal expansion of tie bars become a primary factor for reducing the mold clamping force.

Thus, foreign disturbance factors, such as the heating temperature of the mold and the outside air temperature, etc., become significant primary factors to maintaining the mold clamping force correctly in the toggle-type mold clamping apparatus. An injection molding machine in which the variation of the mold clamping force is suppressed by having a toggle-type mold clamping apparatus, which is arranged between a movable platen and mounted with a movable side mold and a rear platen advanced/retracted by a servo motor for clamping the movable platen, and provided with a mold clamping force adjustment means for moving the position of rear platen to adjust the mold clamping force, acquiring a mold clamping force used as a standard, and more specifically, a peak current value used as a standard proportional to the mold clamping force and adjusting the position of rear platen by the mold clamping force adjustment means in accordance with the difference between the peak current value measured for each predetermined cycle in molding cycles thereafter and the peak current value used as standard, is also disclosed in Japanese Laid-Open Patent Application No. 2004-122579.

However, the conventional mold clamping force correction method (for injection molding machine) had the following problems.

First, the peak current value decreases in a small-size mold of small load torque and the peak current value increases in a large-size mold of a large load torque, particularly, an accurate adjustment is difficult to make due to the reduction of sensitivity in a small-size mold and the peak current value (absolute value) greatly differs depending upon the size of mold, the method is poor in the accuracy of mold clamping force adjustment and versatility in use, making matching adjustment necessary for each mold, etc.

Figure 5:
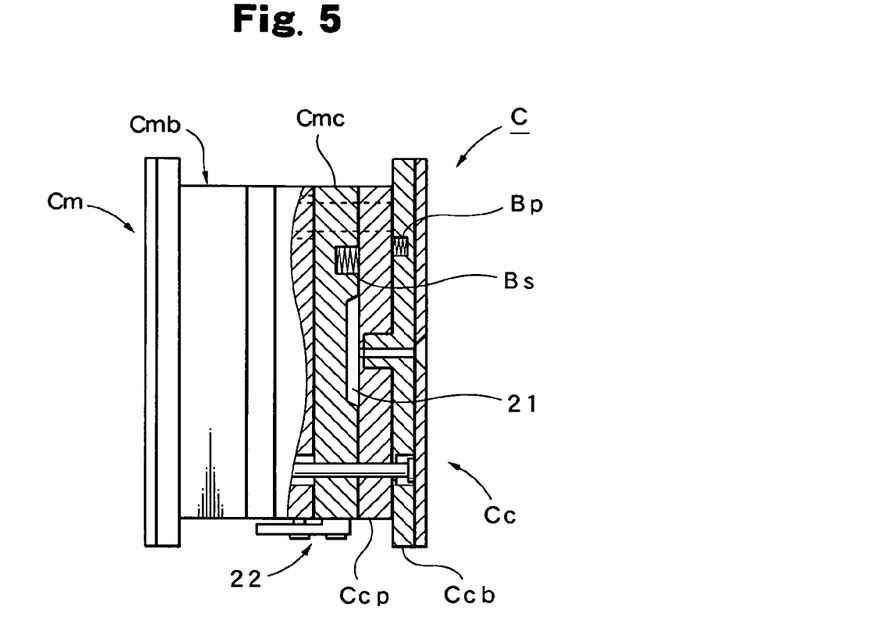
FIG. 5 is a partial sectional side view in the mold clamped state of a spring-built-in mold clamped by the toggle-type mold clamping apparatus.
Figure 6:
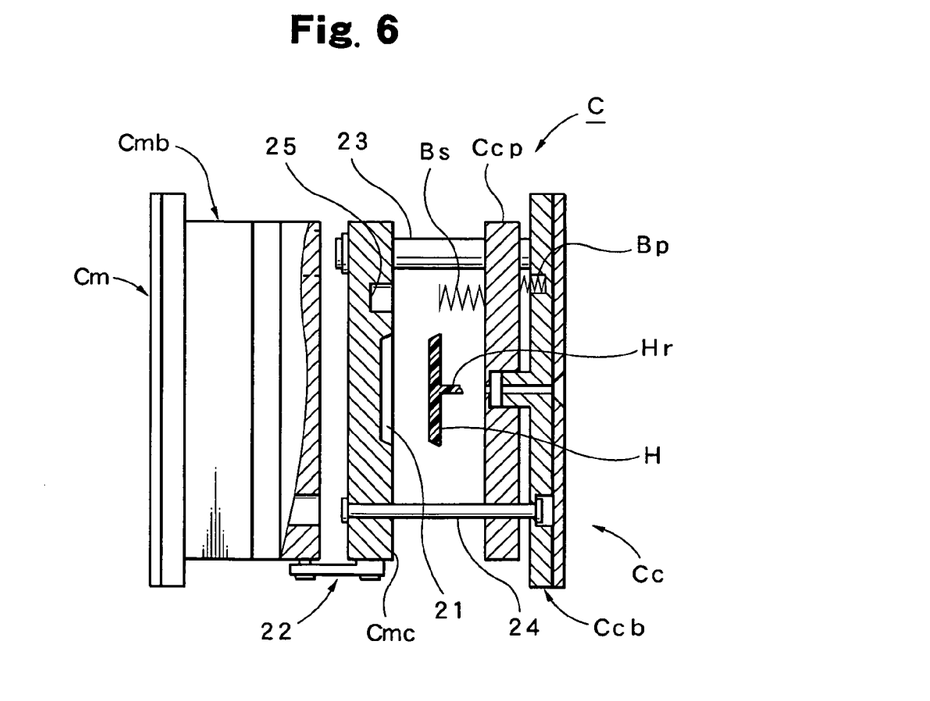
FIG. 6 is a partial sectional side view in the mold opened state of the spring-built-in mold.

Secondly, the peak current value and the mold clamping force are frequently not in proportion depending on the mold (injection molding machine), making the method difficult to use. In an actual injection molding machine, the mold clamping control is also accomplished by torque limitation so that the load torque does not exceed a provided magnitude from the view-point of mold protection more than a few cases, as shown in FIG. 5 and FIG. 6, and it is also possible to use a spring built-in mold C in which springs Bs lie between a movable mold Cm and a stationary mold Cc in several cases, where the peak current value and the mold clamping force are not proportional and the method is deficient in flexibility and reliability.

SUMMARY OF THE INVENTION

An object of the present invention consists of providing a mold clamping force correction method for a mold clamping apparatus which accurately adjust the mold clamping force even if the mold is small in size, does not require a matching adjustment for each mold and can increase the versatility.

Another object of the present invention consists in providing a mold clamping force correction method for a mold clamping apparatus that can adjust the mold clamping force reliably and accurately even if the mold clamping control is performed by torque limitation or a mold with a built in spring, and is excellent in terms of flexibility and reliability.

Still another object of the present invention consists in providing a mold clamping force correction method for a mold clamping apparatus that can obtain variation by a variety of methods and select an optimal method for each mold.

To achieve these objectives, a mold clamping force correction method for a mold clamping apparatus relating to the present invention is characterized by the fact that when variation in mold clamping force for a mold during production is detected and the mold clamping force is corrected on the basis of the detected variation, the work load accompanying high-pressure mold clamping of the mold clamping process is used as the variation, the work load used as a standard accompanying the high-pressure mold clamping (standard work load Ws) is preset, the work load accompanying high-pressure mold clamping of the mold clamping process (detection work load Wd) is detected during production, and the mold clamping force is corrected on the basis of the deviation Ke of the detection work load Wd and the standard work load Ws.

DETAILED DESCRIPTION OF THE PREFERRED EMBODIMENT

The present invention is described in detail hereafter based on the drawings by providing a preferred embodiment relating thereto. Attached drawings do not specify the present invention and are provided for understanding of the present invention to be easy. A detailed description of well-known parts is omitted to avoid obscuring the present invention.

The constitution of a toggle-type mold clamping apparatus Mc capable of implementing the mold clamping force correction method relating to the present embodiment is described hereafter with reference to FIG. 4~FIG. 7.

Figure 4:
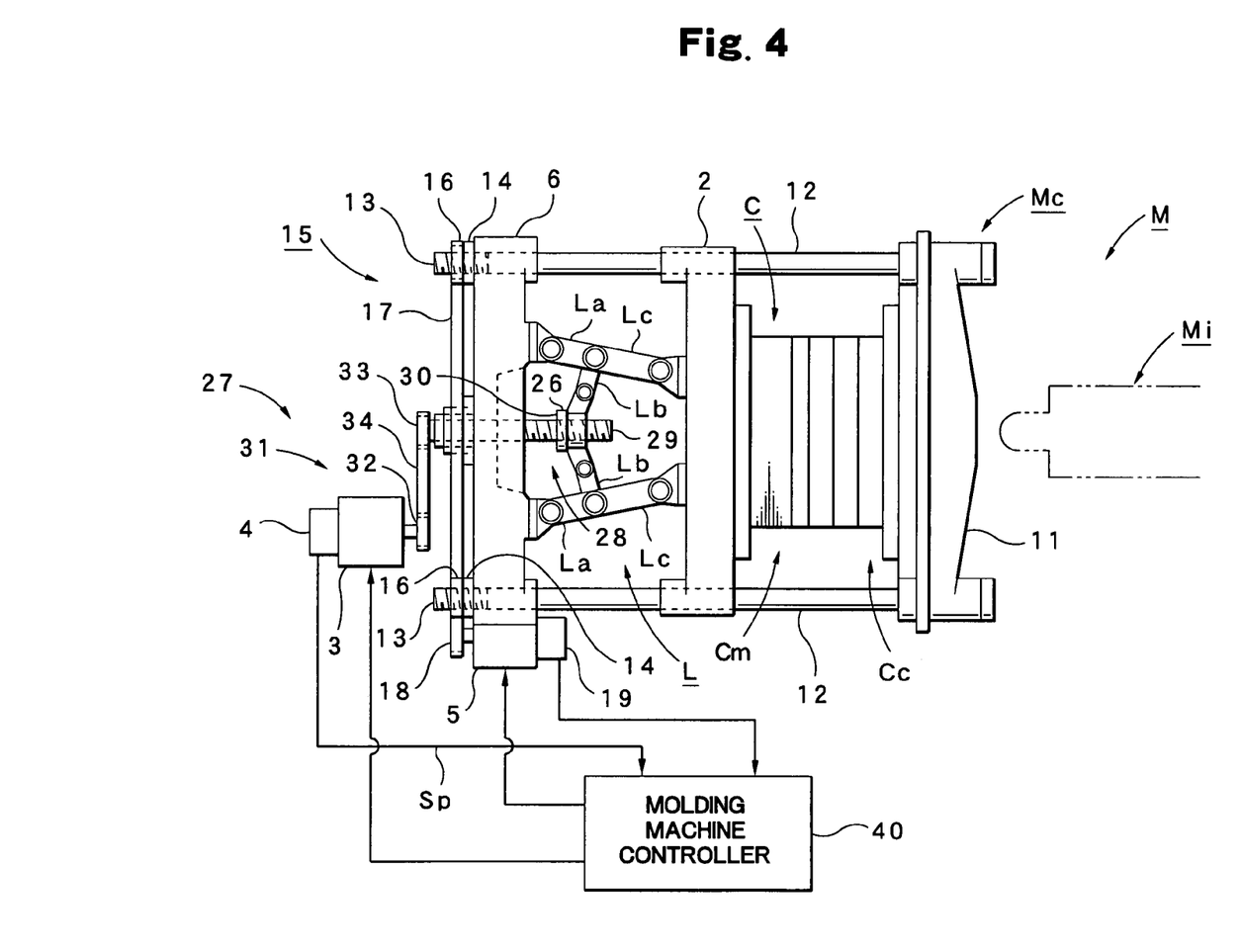
FIG. 4 is a block diagram of a toggle-type mold clamping apparatus for implementing the mold clamping force correction method.

FIG. 4 shows an injection molding machine M and is provided with a toggle-type mold clamping apparatus Mc and an injection device Mi. The toggle-type mold clamping apparatus Mc is provided with a stationary platen 11 and a pressure-bearing platen 6 arranged apart, wherein the stationary platen 11 is fixed onto a non-illustrated machine base, and the pressure-bearing platen 6 is so supported that it can advance and retract on the machines base. Four tie bars 12 are erected between the stationary platen 11 and the pressure-bearing platen 6, in which case, Front ends of the tie bars 12 Jare fixed to the stationary platen 11 and rear ends of the tie bars 12 are inserted through the pressure-bearing platen 6, and adjustment nuts 14, which also serve as stoppers for the pressure-bearing platen 6, are screwed with screws 13 formed at the rear ends, respectively. The adjustment nuts 14 construct a mold-thickness adjustment mechanism 15 for adjusting the position of pressure-bearing platen 6, which is further provided with small gears 16 coaxially and integrally provided on the respective adjustment nuts 14, a large gear 17 engaged with the small gears 16, a drive gear 18 engaged with the large gear 17, a mold-thick-ness adjustment motor 5, and a rotary encoder 19 for detecting the revolutions of the mold-thickness adjustment motor 5.

In this case, small gears 16 are arranged at four corners of a square, respectively and the large gear 17 is surrounded by the small gears 16, therefore the small gears 16 are simultaneously engaged with the large gear 17. If the mold-thickness adjustment motor 5 is operated, the rotation of drive gear 18 is transmitted to the large gear 17, the small gears 16 are simultaneously rotated and the integrally rotating adjustment nuts 14 advance and retract along the screws 13 of tie bars 12, therefore the pressure-bearing platen 6 can also advance and retract to adjust its position in the forward/backward direction. On the other hand, a movable platen 2 is slidably mounted to the tie bars 13, with a spring built-in mold C being supported by the movable platen 2 and the stationary platen 11.

The spring built-in mold C is shown in FIG. 5 and FIG. 6, and is provided with a movable half mold Cm supported on the movable platen 2 and a stationary half mold Cc supported on the stationary platen 11, and a spring Bs lies between the movable half mold Cm and the stationary half mold Cc. The movable mold Cm is provided with a movable half mold body Cmb mounted on the movable platen 2 and a cavity-type mold Cmc separate from this movable half mold body Cmb, and a cavity 21 is formed in this cavity-type half mold Cmc. Thereby, the cavity-type half mold Cmc interlocks with the movable half mold body Cmb to advance and retract, and a movement stroke relative to the movable half mold body Cmb is controlled by a parting lock mechanism 22.

The stationary half mold Cc is provided with a stationary mold body Ccb mounted to the stationary platen 11 and a liner protruding plate Ccp separate from the stationary half mold body Ccb, wherein the cavity-type mold Cmc and the liner projection plate Ccp are supported slidably by a guide shaft 23 protruding from the stationary half mold body Ccb, in which case, the movement stroke to the stationary half mold body Ccb of cavity-type mold Cmc is controlled by the guide shaft 23 and the movement stroke to the stationary half mold body Ccb of liner projection plate Ccp is controlled by a limit pin 24. Then, a spring recess 25 is provided in the cavity-type mold Cmc and is provided by fixing one end of spring Bs at the opposite position of liner projection plate Ccp. Moreover, a spring Bp lies between the liner projection plate Ccp and the stationary half mold body Ccb.

Therefore, if the spring-built-in mold C thus constructed is in the mold clamped state shown in FIG. 5, all the movable half mold body Cmb, cavity-type mold Cmc, liner projection plate Ccp and stationary half mold body Ccb become the pressed state, and both the spring Bs lying between the cavity-type mold Cmc and the liner protruding plate Ccp and the spring Bp lying between the liner protruding plate Ccp and the stationary half mold body Ccb become in a compressed state. The movable half mold body Cmb also moves in the mold opening direction with the backward movement of movable platen 6 during mold opening. At this time, the cavity-type mold Cmc is opened to the liner protruding plate Ccp by the energization force of spring Bs and the liner protruding plate Ccp is opened to the stationary half mold body Ccb by the energization force of spring Bp, thus protrusion to a liner Hr of a molded product H is accomplished by the liner protruding plate Ccp. If the spring-built-in mold C becomes the mold-open state (totally open) shown in FIG. 6, a protrusion to the liner Hr of molded product H is accomplished by a non-illustrated ejector mechanism and the molded product H is released from the cavity 21.

In such a spring-built-in mold C, at least spring Bs lies between the liner projection plate Ccp and the cavity-type mold Cmc, therefore the energization force of spring Bs is added to the movable platen 6 from the side where the mold C is closed, and a load torque (drive current) is generated based on the spring Bs. As described above, when monitoring the mold clamping force and detecting the mold-closure position on the basis of magnitude of the load torque (peak current value), an error is generated on the basis of spring Bs and detection becomes unstable. Accordingly, the present invention can adjust the mold clamping force easily and reliably even if the mold is a spring-built-in mold C.

On the other hand, a toggle link mechanism L is provided between the pressure-bearing platen 6 and the movable platen 2. The toggle link mechanism L is provided with a pair of first links La, La pivoted on the pressure-bearing platen 6, a pair of output links Lc, Lc pivoted on the movable platen 2 and a pair of second links Lb, Lb coupled to spindles of first links La, La and second links Lb, Lb, and the second links Lb, Lb are pivoted at the crosshead 26.

Moreover, a mold clamping drive unit 27 is disposed between the pressure-bearing platen 6 and the crosshead 26. The mold clamping drive unit 27 is rotatably provided with a ball screw 29 on the pressure-bearing platen 6 and a ball screw mechanism 28 screwed with the ball screw 29 and having a ball nut 30 integrally provided with the crosshead 26 as well as a rotation drive mechanism 31 for rotationally drive the ball screw 29. The rotation drive mechanism 31 is provided with a mold clamping servo motor 3, a rotary encoder 4 attached to the servo motor 3 and detecting the revolution of the servo motor 3, a drive gear 32 mounted to a shaft of servo motor 3, a driven gear 33 mounted to the ball screw 29 and a timing belt 34 wound around the drive gear 32 and the driven gear 33.

Hence, if the servo motor 3 is operated, the drive gear 32 rotates, the rotation of drive gear 32 is transmitted to the driven gear 33 via the timing belt 34 to rotate the ball screw 29, by which the ball nut 30 advances and retracts. As a result, the crosshead 26 integrated with the ball nut 30 advances and retracts, the toggle link mechanism contracts or extends, and the movable platen 2 advances or retracts in the mold opening direction (backward) or mold closing direction (forward). No. 40 is a molding machine controller to which the servo motor 3, rotary encoder 4, mold-thickness adjustment motor 5 and rotary encoder 19 are connected.

Figure 7:
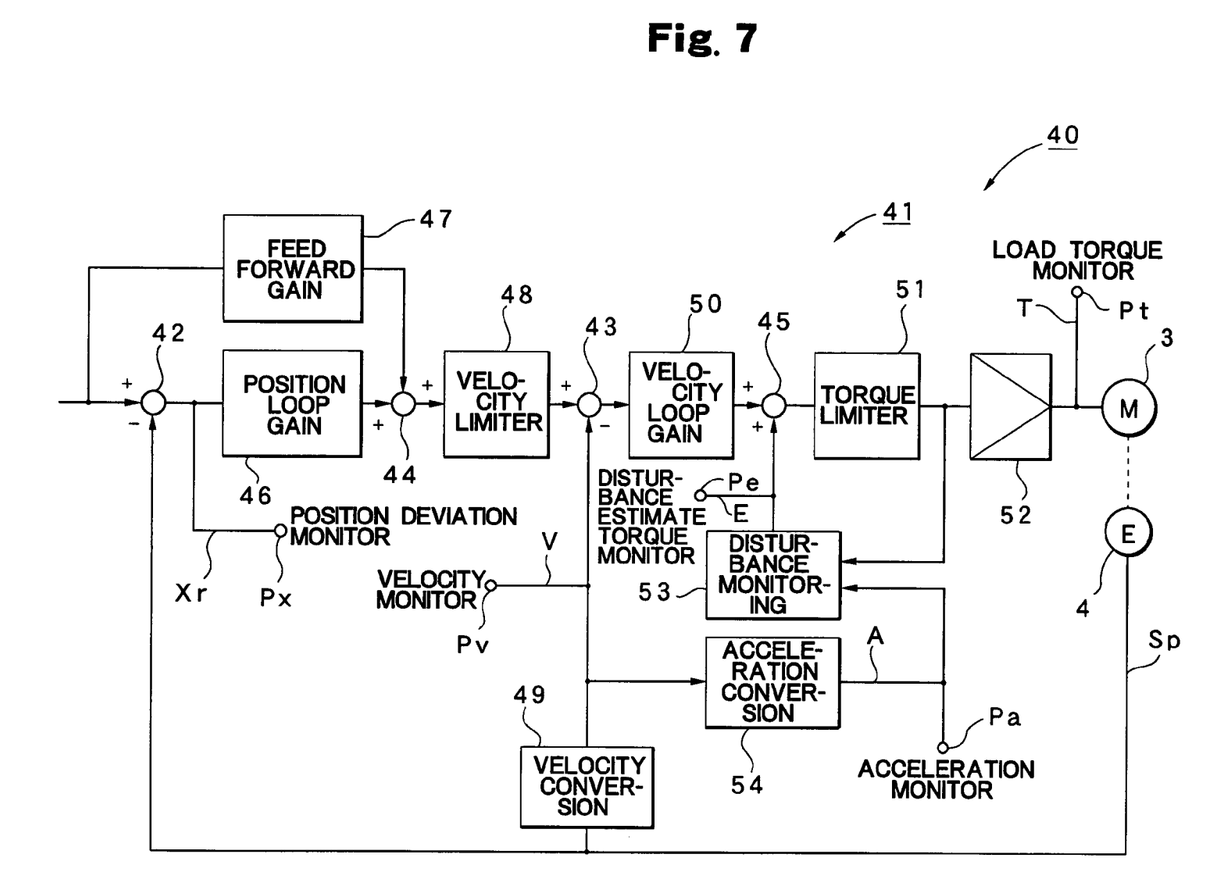
FIG. 7 is a block circuit diagram showing a portion of a molding machine controller provided with the toggle-type mold clamping apparatus.

On the other hand, FIG. 7 shows a servo circuit 41 comprising a portion of molding machine controller 40. The servo circuit 41 is provided with deviation calculation sections 42, 43, adders 44, 45, a position loop gain setting section 46, a feed forward gain setting section 47, a velocity limiter 48, a velocity converter (differentiator) 49, a velocity loop gain setting section 50, a torque limiter 51, a driver 52, a disturbance monitoring section 53, an acceleration converter (differentiator) 54, and a servo control system (the servo circuit 41) is constructed by a system shown in FIG. 7. Then, the mold clamping servo motor 3 is connected to the output side of driver 52, and the rotary encoder 4 attached to this servo motor 3 is connected to the velocity converter 49 and the inverted input part of the deviation calculation section 42, respectively. The non-inverted input part of the deviation calculation section 42 is connected to a non-illustrated sequence controller.

In FIG. 7, Pt denotes a signal input terminal for detection of load torque accompanying the closure of mold C, Pv denotes a signal intake terminal for detection of a velocity V of movable platen 2 accompanying the closure of mold C, Pa denotes a signal intake terminal for detection of an acceleration A of movable platen 2 accompanying the closure of mold C, Pe denotes a signal intake terminal for detection of an estimate torque E generated due to a disturbance with the closure of mold C, and Px denotes a signal intake terminal for detection of a position deviation Xr of movable platen 2 accompanying the closure of mold C, respectively. Moreover, operations (functions) of the respective sections will be described by overall operation of the toggle-type mold clamping apparatus Mc described later.

Next, the operation (function) of the toggle-type mold clamping apparatus Mc including the mold clamping force correction method relating to the present embodiment is described hereafter with reference to FIG. 1~FIG. 11.

Figure 2:
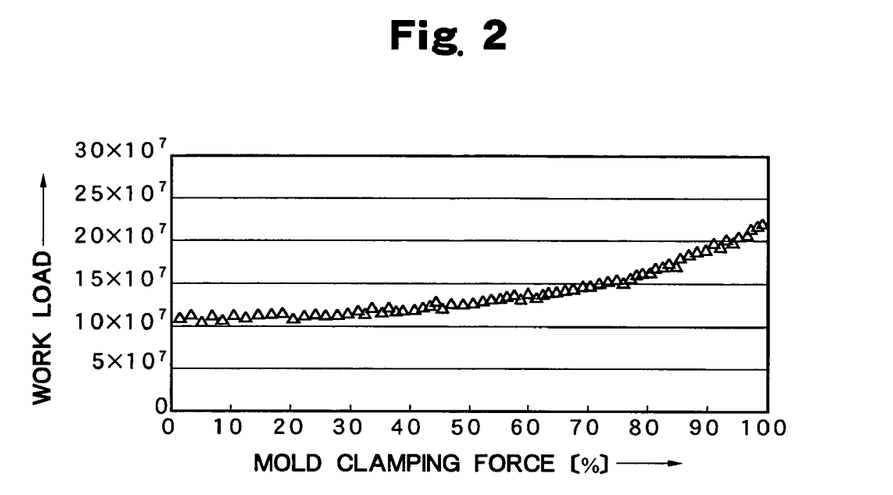
FIG. 2 is a correlation characteristic diagram showing the correlation of the work load vs. the mold clamping force.
Figure 3:
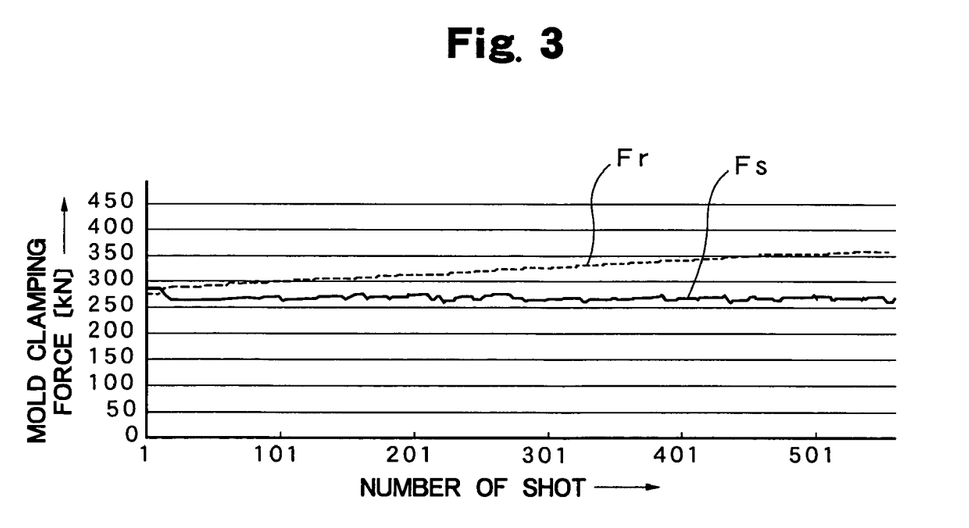
FIG. 3 is a change characteristic diagram showing change of mold clamping force vs. number of shots.

First, the reason the mold clamping force correction method relating to the present embodiment is effective is described. FIG. 2 shows data obtained from measuring the work load by make an automatic mold thickness adjustment every time the mold clamping force setting is changed from 100% to 0%, and there is a certain correlation between the mold clamping force and the work load. Moreover, the high-pressure mold clamping changeover position is not changed for the data shown in FIG. 2, therefore it is considered that the lower the mold clamping force, the more the position deviation between the mold clamping changeover position and the mold touch position and the less the correlation in a region of low mold clamping force, but if it is a region of mold clamping force of at least about 40% or higher, there is a certain correlation between the mold clamping force and the work load even if the high-pressure mold clamping changeover position is not changed. FIG. 3 shows data of the mold clamping force change vs. the number of shot. The shot numbers total 560 times, The mold temperature increased from 24° C. (ordinary temperature) to 60° C. from the start of shot to the 560th shot, in which case, if the mold clamping force correction is made, the mold clamping force changes like a change characteristic line Fr, and the mold clamping force gradually increases with increasing the number of shot. However, if the mold clamping force correction is made on the basis of work load accompanying the high-pressure mold clamping, the mold clamping force changes like a change characteristic line Fs, and the mold clamping force becomes nearly constant even if the number of shot increases. The present invention aims at having a certain correlation between the work load accompanying such high-pressure mold clamping and the mold clamping force and uses the work load accompanying the high-pressure mold clamping as variation of the mold clamping force.

A specific processing procedure is described next. First, a work load is established that becomes a standard (standard work load) accompanying a high-pressure mold clamping necessary during the implementation of the mold clamping force correction method relating to the present embodiment.

In physics, a regular work load means a physical quantity relating to the present embodiment when a force works to move an object, and its unit is indicated in Joules. However, in the mold clamping force correction method relating to the present embodiment, it suffices to use the work load as a relative variation and accurate physical quantities as absolute values are not needed. Therefore, not only a regular work load but also all physical quantities proportional to (corresponding to) the regular work load are included in the work load in the present embodiment (the present invention).

Accordingly, the magnitude of the load is found by integrating the work load accompanying the high-pressure mold clamping over the mold position in the present embodiment, in which case, the torque value T accompanying high-pressure mold clamping is used as the magnitude of load. The load torque (torque value) accompanying the closure of mold C obtained from the signal intake terminal shown in the FIG. 7 may be used as the load torque value T, or a torque command value may also be used in its existent state. Moreover, the mold position used in the integration should be the position of movable platen 2, and the position of movable platen 2 begins with the position of movable platen 2 itself or the position of crosshead and also includes a pulse number R of an encoder pulse Sp obtained from the rotary encoder 4 for detecting the revolution of mold clamping servo motor 3 used in the present embodiment, etc. Thus, the present embodiment can be easily implemented without additional new detecting means by use of the torque value T accompanying the high-pressure mold clamping as the magnitude of load and the pulse number R of encoder pulse Sp obtained from the rotary encoder 4 as mold position.

Figure 8:
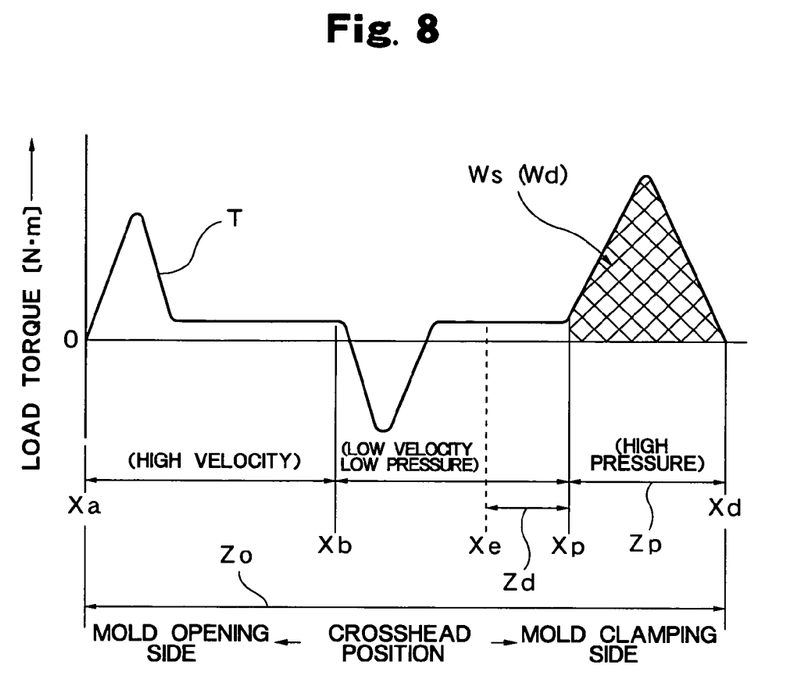
FIG. 8 is a change characteristic diagram of the load torque vs. the position of the crosshead for describing the mold clamping force correction method.

A high-pressure mold clamping changeover position Xp is established when switching from a low-pressure low-velocity mold clamping to a high-pressure mold clamping in the mold clamping process (FIG. 8). This high-pressure mold clamping changeover position Xp is established according to a mold touch position (mold-closure position). An operator can visually confirm the mold clamping change-over position Xp or manually set it up with reference to a change of the load torque T, etc. In the present embodiment, when the variation of mold clamping force is monitored, the work load accompanying high-pressure mold clamping (Ws, Wd), i.e., the magnitude of area enclosed by a characteristic line of torque value T shown in FIG. 9 (Ws, Wd) is monitored, the effect of high-pressure mold clamping changeover position Xp becomes small and the high-pressure mold clamping changeover position Xp is basically unchanged, but the high-pressure mold clamping changeover position Xp can also be changed as necessary.

Figure 1:
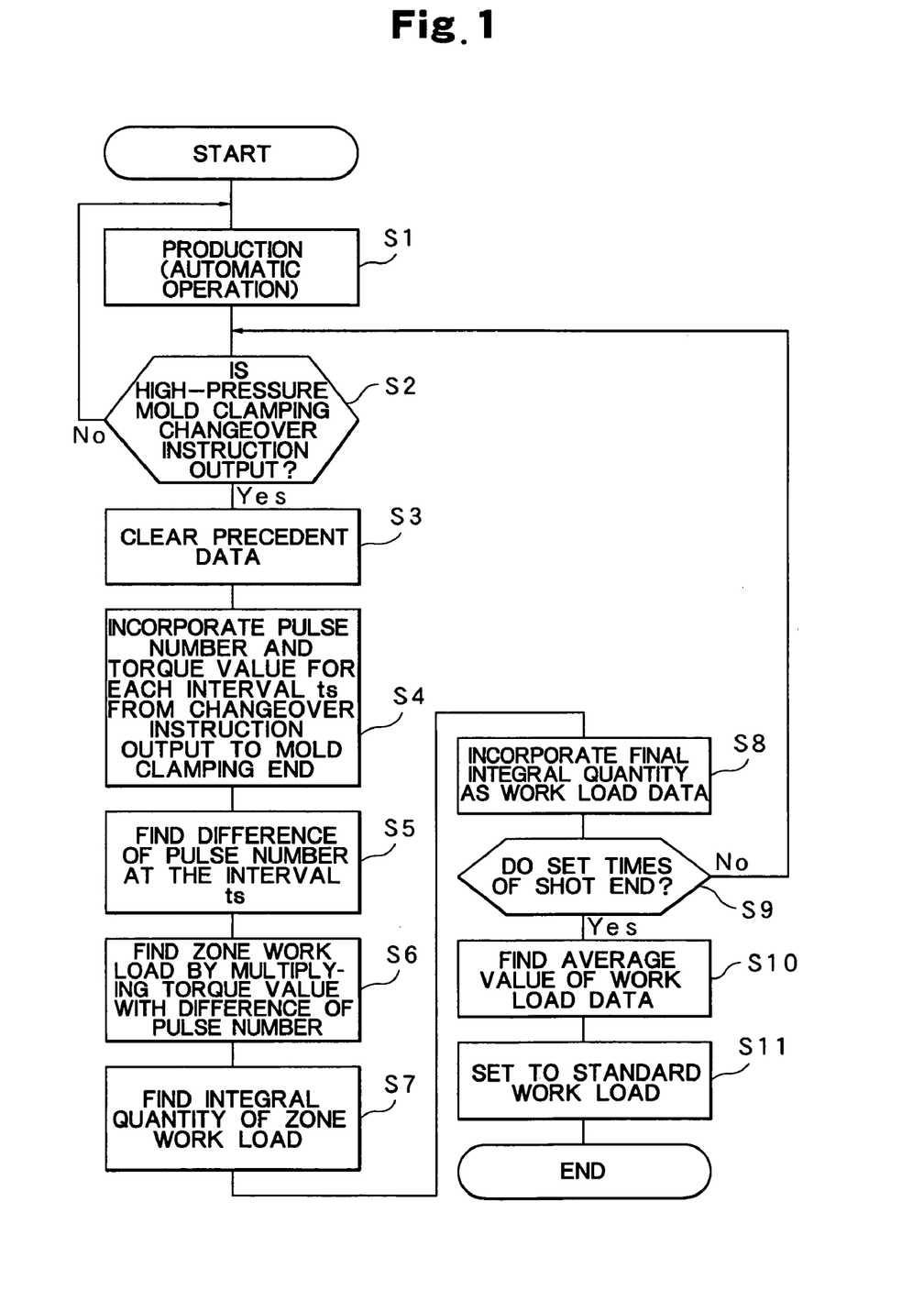
FIG. 1 is a flowchart showing a processing procedure for obtaining a work load (standard work load) used in a mold clamping force correction method relating to a preferred embodiment of the present invention.

A specific processing procedure of the standard work load Ws is described hereafter with reference to the flowchart shown in FIG. 1 below.

When the standard work load Ws is established, the shot portion of a predetermined number of times at the initial stage during production can be utilized. Where an injection molding machine M starts an automatic operation during production (step S1), it executes the molding cycle of the first shot, therefore the molding machine controller 40 monitors whether the movable platen 2 reaches a high-pressure mold clamping changeover position Xp. More specifically, whether a high-pressure mold clamping changeover instruction is output. If the mold C is in the timing of starting the mold clamping operation from the mold-opening position (full-open position) with the progress of the molding cycle, the crosshead 26 of toggle link mechanism L is in the mold-opening position Xa shown in FIG. 8, therefore the crosshead 26 moves forward with the start of the mold clamping operation (operation of mold clamping servo motor 3) and the movable platen 2 moves from the mold-open position to the mold-closed position.

In this case, the movable platen 2 moves forward at high velocity to initially carry out high velocity mold closure. On the other hand, operations of the servo circuit 41 are as follows. First, velocity control and position control for the movable platen 2 are performed (crosshead 26). Namely, a position instruction value is provided from the sequence controller to the deviation calculation section 42 of servo circuit 41 and compared with a position detection value obtained on the basis of an encoder pulse of rotary encoder 4. A position deviation Xr is obtained from the deviation calculation section 42, therefore a feedback control of position is performed on the basis of the position deviation Xr.

The position deviation Xr is compensated by the position loop gain setting section 46 and provided to the input part of adder 44, and the position instruction value is compensated by the feed forward gain setting section 47 and provided to the input part of adder 44. Then, the output of adder 44 is provided to the non-inverted input part of deviation calculation section 43 via the velocity limiter 48. On the other hand, the position detection value is differentiated by the velocity conversion section 49 and converted to a velocity (velocity detection value) V, and this velocity V is provided to the inverted input part of deviation calculation section 43. A velocity deviation is obtained from the deviation calculation section 43, therefore velocity feedback control is performed on the basis of the velocity deviation, in which case the velocity V is limited by the velocity limiter 48.

The velocity deviation is compensated for by a velocity loop gain setting section 50 and provided to the input part of adder 45. On the other hand, the velocity is differentiated by an acceleration conversion section 54 to convert it to an acceleration (acceleration detection value) A, which is provided to the input part of a disturbance monitoring section 53. The disturbance monitoring section 53 monitors the acceleration A. For example, if the acceleration A abnormally changes due to some reason (disturbance), an estimated torque (torque value) E is output for accelerating a return. The estimate torque E is then provided to the input part of adder 45 as a correction value. As a result, a torque instruction (instruction value) is obtained from the adder 45, and provided to the driver 52 via the torque limiter 51, by which the servo motor 3 is drive controlled, and position control and velocity control are performed for the movable platen 2. The torque instruction output from the torque limiter 51 is fedback to the input part of disturbance monitoring section 53.

On the other hand, the movable platen 2 moves forward in the mold closure direction, and if the cross-head 26 reaches a preset low-pressure low-velocity changeover point Xb, it switches to low-pressure low-velocity mold closure. As shown in FIG. 8, a mold protection zone Zd is established in the pressure low-velocity mold closure to carry out mold protection processing such as the detection of foreign objects. Namely, the magnitude of load torque T is monitored in the mold protection zone, and if T exceeds a preset threshold, it is determined that an foreign object exists and an abnormality processing, such as mold opening control, etc. is performed. If the mold protection zone ends and the crosshead 26 reaches a preset high-pressure mold clamping changeover position Xp, high-pressure mold clamping changeover instruction is output to switch it to high-pressure mold clamping (step S2). Moreover, Xe denotes the start position of the mold protection zone, and Zo denotes the mold clamping period.

Figure 9:
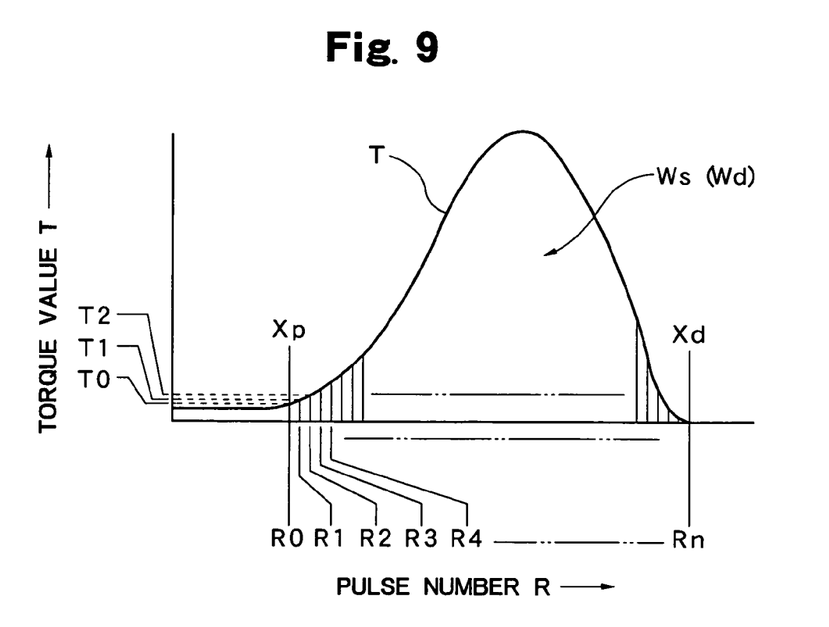
FIG. 9 is a change characteristic diagram of the load torque vs. the pulse number in a high-pressure mold clamping zone for describing the mold clamping force correction method.

The molding machine controller 40 receives the output of high-pressure mold clamping changeover instruction to find the work load accompanying the high-pressure mold clamping and executes a detection processing of work load set as standard work load Ws, in which case, first, data relating to the precedent standard work load Ws are cleared (step S3). Then, pulse numbers R and torque values T of encoder pulse Sp obtained from the rotary encoder 4 are sequentially incorporated for each preset sampling interval ts (e.g., 500 μs) in a high-pressure mold clamping zone Zp from the high-pressure mold clamping changeover position Xp to the mold clamping end position Xd where the toggle link mechanism L becomes a lock-up state (FIG. 8) (step S4). As shown in FIG. 9, pulse numbers R0, R1, R2 JRn are sequentially incorporated and torque values T0, T1, T2 are sequentially incorporated together for each sampling interval ts from the high-pressure mold clamping changeover position Xp. FIG. 9 shows a state that the pulse number R0 and the torque value T0 are incorporated at the high-pressure mold clamping changeover position Xp and the pulse number R1 and the torque value T1 are incorporated after a sampling interval ts from the high-pressure mold clamping changeover position Xp.

If the pulse numbers R0, R1, R2 ... Rn are sequentially incorporated and torque values T0, T1, T2 are obtained for each sampling interval ts, differences (R1−R0), (R2−R1) of the pulse numbers in each sampling interval ts are sequentially found (step S5). If the differences (R1−R0) of pulse numbers are obtained, they are multiplied by a torque value T to sequentially find zone work loads (R1−R0)≅T0, (R2−R1)≅T1 ](step S6). Then, the obtained zone work loads are sequentially integrated to find an integral quantity of all zone work loads in the high-pressure mold clamping zone Zp (step S7). If the total integral quantity in high-pressure mold clamping zone Zp, i.e., the final integral quantity at the mold clamping end position Xd is obtained, it is incorporated as work load data (step S8).

Whether the high-pressure mold clamping changeover instruction is similarly output as the first shot is monitored to execute the molding cycle of second shot by continuation of automatic operation, if it is output, the work load data is obtained by similar work load detection processing (steps S9, S2). Hereafter, the similar processing is repeated, and if it reaches a preset number of shot times, an average value of incorporated multiple work load data is found and the obtained average value is set as standard work load Ws (step S9, S10, S11). Thus, highly reliable data in which noise component is removed by averaging the work load data obtained from multiple shots to find the standard work load Ws (detection work load described later is the same) can be obtained.

Figure 10:
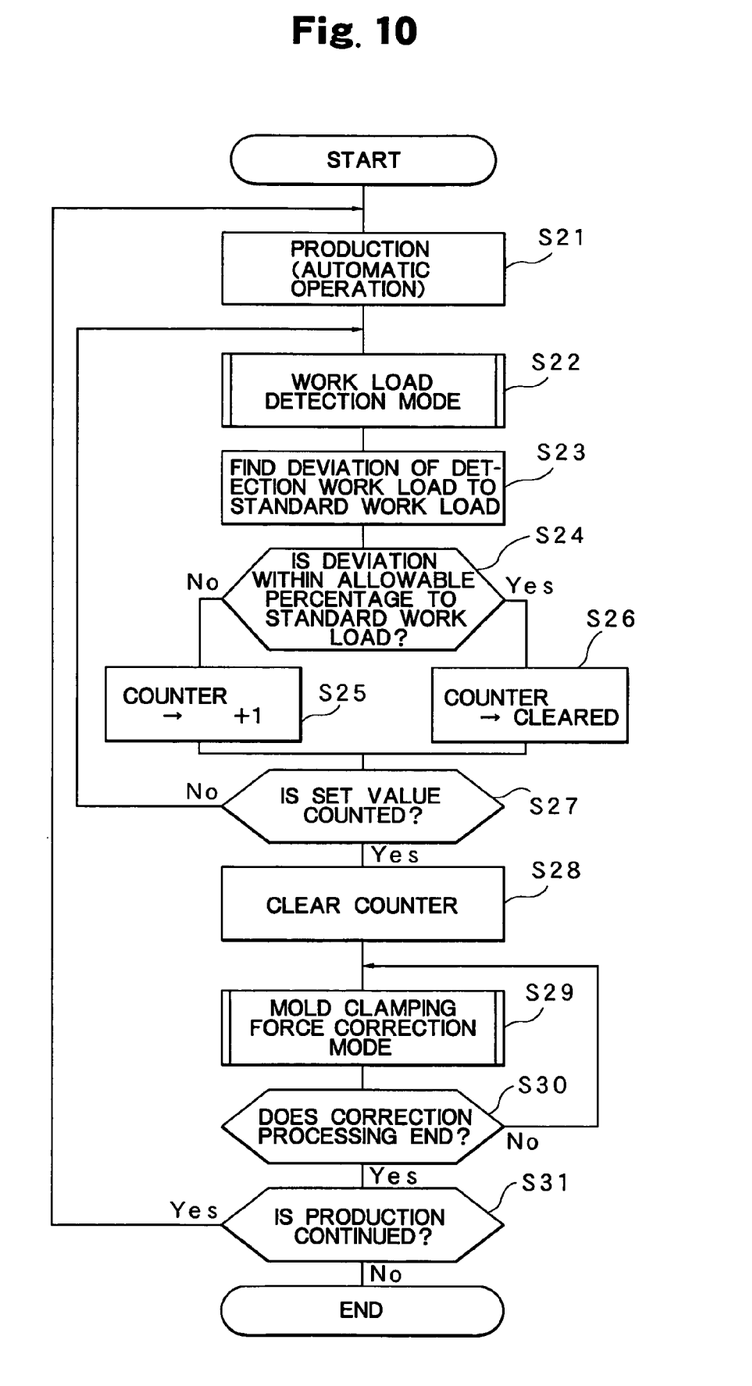
FIG. 10 is a flowchart showing a processing procedure during production for implementing the mold clamping force correction method.
Figure 11:
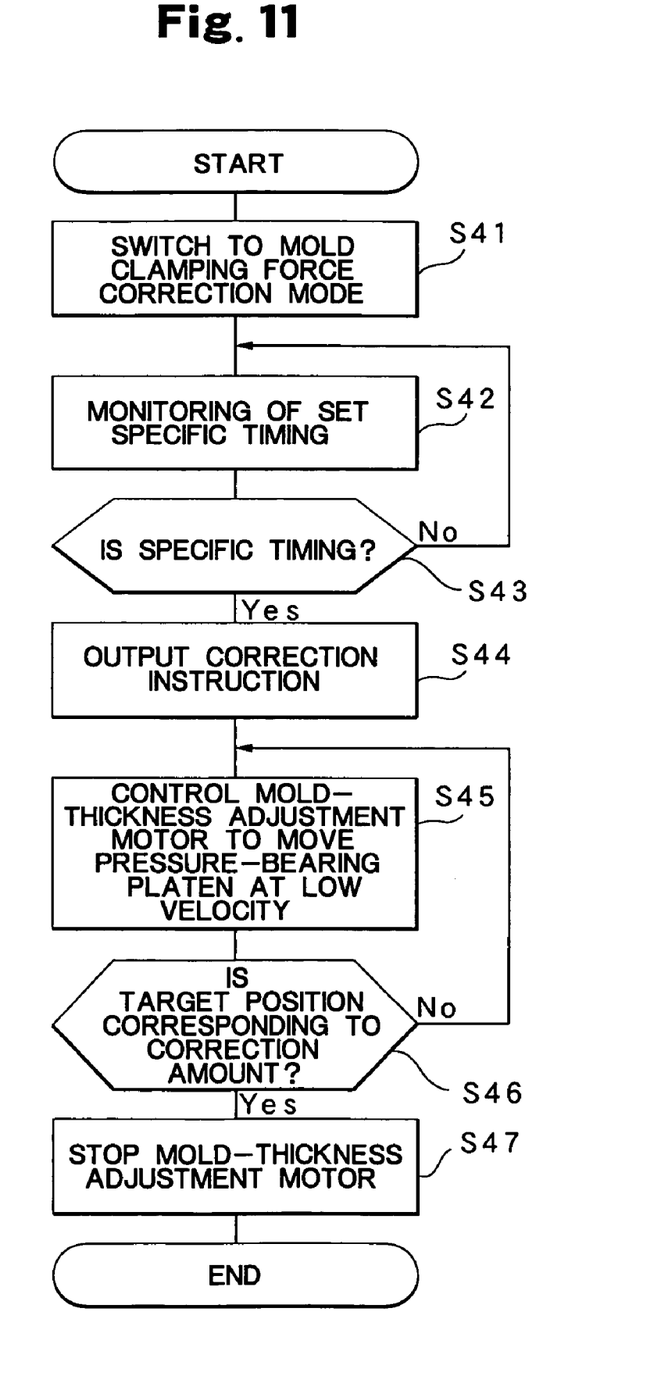
FIG. 11 is a flowchart showing a processing procedure in a mold clamping force correction mode executed by the mold clamping force correction method.

Next, a correction procedure for a mold clamping force using this standard work load Ws is described according to a flowchart shown in FIG. 10 (FIG. 11).

Now, the production based on automatic operation is continued after the standard work load Ws is established (step S21). If the production is continued and reaches a preset detection time of detection number of shot, a work load detection mode is automatically executed according to the flowchart shown in FIG. 1 for finding the standard work load Ws, and the work load accompanying mold clamping (detection work load Wd) is obtained by a similar processing procedure as that of the case of setting the standard work load Ws. The execution interval of the work load detection mode may be an interval for every shot or for every certain number of shot (or a certain time), and it can be established by considering the degree of variation of mold clamping force in a real machine, etc.

On the other hand, the magnitude of standard work load Ws and the magnitude of detection work load Wd are compared to find a deviation of the both in the molding machine controller 40 (step S23). Then, a determination is made as to whether the obtained deviation Ke is in a preset allowable range Za. More specifically, a determination is made as to whether the deviation Ke is within an allowable percentage (e.g., ∀5%) set for the magnitude of standard work load Ws (step S24). As a result of the determination, if the deviation Ke falls beyond the allowable percentage, ⌈+1⌋ is counted (step S25) in a counter. By contrast, if it is within the allowable percentage, the counter is cleared (step S26).

When the counter counts a preset constant (e.g., ⌈3⌋), a correction for the mold clamping force is performed, in which case, first, the counter is cleared (steps S27, S28), and then a mold clamping force correction mode is executed (step S29). Thus, the work load accompanying the high-pressure mold clamping (detection work load Wd) is monitored at predetermined timing in the production, and correction is accomplished only when the detection work load Wd varies beyond an allowable range Za continuously for a set number of times. Accordingly, when the detection work load Wd varies beyond the allowable range for only one time, it is determined to be caused by a temporary factor such as disturbance and correction is not carried out, enabling an increase in stability and reliability during correction.

Next, the processing procedure when making a correction processing by the mold clamping force correction mode is described according to a flowchart shown in FIG. 11.

Correction processing is accomplished at preset specific timing without interrupting the molding cycle. Periods other than the mold clamping period, i.e., the mold opening period, protrusion period, intermediate period, etc. can be used as specific timings which do not interrupt the molding cycle. In a case in which the protrusion period is set as a period (specific timing) for performing the correction processing, the molding machine controller 40 monitors whether the protrusion period is started with switching to the mold clamping correction mode (steps S41, S42). Then, a correction instruction is output by the starting timing of protrusion period, and the correction processing is executed on the basis of the correction instruction (steps S43, S44).

In correction processing, first, the mold-thickness adjustment motor 5 is drive controlled on the basis of a preset constant correction amount, and the pressure-bearing platen 6 is displaced in a direction of decreasing the deviation Ke (step S45). At this time, the pressure-bearing platen 6 is moved at a velocity lower than the regular velocity. The position of pressure-bearing platen 6 is detected by an encoder pulse of the rotary encoder 19 attached with the mold-thickness adjustment motor 5 to perform a feedback control for the position. The rotary encoder 19 of pressure-bearing platen 6 is an increment encoder and performs the detection of an absolute position by a pulse number of encoder pulses (generation number). Then, if the pressure-bearing platen 6 is moved to a target position corresponding to the correction amount (steps S46, S47), the mold-thickness adjustment motor 5 is stop controlled. Such an automatic correction processing enables to make a timely and quick correction and avoid the interruption of production to contrive an improvement of productivity, in which case, a constant correction amount is used, therefore the same correction processing is repeated until the deviation Ke becomes within the allowable range Za when the correction is not nicely made. Although the case of using a constant correction amount was exemplified, of course, a relation between the correction amount vs. the deviation Ke may also be constructed as a database and correction accomplished according to a correction amount corresponding to the deviation Ke, i.e., a correction amount that offsets the deviation Ke by one-time correction processing.

The correction processing can also be performed by use of a prepared automatic mold clamping force setting function (automatic mold-thickness adjustment function) in the toggle-type mold clamping apparatus Mc as it is. The automatic mold-thickness adjustment function is a function that automatically sets up the mold clamping force by setting a target value of mold clamping force in the initial stage. If such a prepared automatic mold clamping force setting function is utilized, more accurate correction can be made. Moreover, an additional setup function and a separate position detecting means become unnecessary by using the automatic mold-thickness adjustment function and performing the position detection of pressure-bearing platen 6 by use of the rotary encoder 19, which contributes to miniaturization and low cost.

Automatic correction by an operator is also possible for such an automatic correction, in which case, an allowable range Za for the deviation Ke is preset. If the deviation Ke falls beyond the allowable range Za, notification is provided by an alarm, etc. Thereby, an operator can confirm the condition and, after which he can start the mold clamping force correction mode, for example, by touching a mold clamping force correction key. Correction by the manual operation of an operator can also be carried out as necessary, in which case, notification is provided by an alarm, etc. an operator confirms the condition and can correct it to obtain any magnitude mold clamping force, enabling correction including the experience and know-how of the operator and also judging it to be unnecessary to make a correction according to the kind of molded products to give priority to production. Therefore, the production (automatic molding) is continued as it is until the operator performs the correction operation. Such a mode for correction processing can be pre-selected by a selection key at the display screen of a display device.

On the other hand, if the mold clamping force correction mode ends and production continues, the same correction processing for mold clamping force is repeatedly executed, after correction, mold clamping is accomplished by a changed mold clamping force (steps S30, S31).

Accordingly, by the mold clamping force correction method for the mold clamping apparatus relating to such an embodiment, the work load accompanying the high-pressure mold clamping is used as variation of mold clamping force. Therefore, as compared with the case of monitoring a peak current value, etc., an accurate adjustment on mold clamping force can be made even for a small mold, the matching adjustment for each mold is unnecessary, and the versatility in use can be increased. Moreover, the work load accompanying the high-pressure mold clamping is monitored, therefore the adjustment of mold clamping force can be made reliably and accurately and is excellent in flexibility and reliability even when the mold clamping control is performed by torque limitation or the spring-built-in mold C is used. Furthermore, the work load can be obtained by a variety of methods, e.g., it can be obtained by integrating the magnitude of load accompanying the high-pressure mold clamping over mold position or time, etc.

The embodiment was described in detail above, but the present invention is not limited to such an embodiment, and can be arbitrarily changed in a scope where the spirit of the present invention does not deviate in terms of technical of details, construction, quantity, etc. and, as necessary, it can be supplemented and deleted.

For example, the case of setting the standard work load Ws by use of shots at the initial stage during production was exemplified, but it may also be carried out in such a manner that a standard work load Ws setup mode is provided, a standard work load Ws is established by this standard work load Ws setup mode and then the production is started. The case of finding the work load by integrating the magnitude of load accompanying the high-pressure mold clamping over position was shown, the work load may also be found by integration with time, in which case, the torque value T may be detected for each sampling interval ts and then the sampling interval ts is multi-plied by this torque value T. The integration with time is particularly effective when the mold clam-ping force is generated in the vicinity of rating value of mold clamping servo motor 3. This is because it is feared that the torque of mold clamping servo motor 3 is saturated before the mold clamping force is generated and an accurate work load cannot be detected, in which case, the sampling interval ts is multiplied for the torque value T, besides, the rotational velocity of mold clamping servo motor 3 may also be multi-plied. On the other hand, the work load can also be found from other physical quantities, e.g., by integrating the power consumption or heat generation, etc. with time, and the position of movable platen 2, the position of crosshead 26, the position of toggle link mechanism L, etc. may also be directly detected as mold position. The spring-built-in mold C where springs Bs lie between the movable half mold Cm and the stationary half mold Cc as mold, but a common mold without built-in springs may be used and is suitably used in carrying out high-pressure mold clamping by torque limitation.

What is claimed is:

1. A method for correcting a mold clamping force in a mold clamping apparatus wherein the mold clamping apparatus includes a spring-built-in mold lying between a movable half mold and a stationary half mold, and in which a variation in the mold clamping force, during a production operation, is detected and the mold clamping force is corrected on the basis of the detected variation, and wherein
    a work load accompanying high-pressure mold clamping of a mold clamping process is used as the variation, which comprises:
        presetting work load as a standard (standard work load) accompanying high-pressure mold clamping,
        detecting the work load accompanying high-pressure mold clamping of the mold clamping process (detection work load) during production, and
        correcting the mold clamping force on the basis of a deviation of the standard work load from the detected work load, wherein the work load is ascertained by integrating the magnitude of load in a high-pressure mold clamping section from a high-pressure mold clamping switching position, which is a preset unchanged position, where the high-pressure mold clamping is started, to a mold clamping completion position in a mold clamping process, in which high-speed mold clamping, low-pressure, low-speed mold clamping and high-pressure mold clamping are sequentially performed over mold position or time,
    wherein a torque value accompanying high-pressure mold clamping is used as magnitude of the load.

2. The mold clamping force correction method for a mold clamping apparatus according to claim 1,
    wherein a pulse number of encoder pulse obtained from a rotary encoder detecting the revolution of a mold clamping servo motor is used to determine the mold position.

3. The mold clamping force correction method for a mold clamping apparatus according to claim 1,
    wherein the standard work load is found by averaging the work load obtained from multiple shots.

4. The mold clamping force correction method for a mold clamping apparatus according to claim 1,
    wherein the detection work load is found by averaging the work load obtained from multiple shots.

5. The mold clamping force correction method for a mold clamping apparatus according to claim 1,
    wherein an allowable range is established for the deviation, and the correction is accomplished if the deviation falls beyond the allowable range.

6. The mold clamping force correction method for a mold clamping apparatus according to claim 5,
    wherein the deviation is continuously found multiple times, and the correction is accomplished if the found deviations continuously fall beyond the allowable range.

7. The mold clamping force correction method for a mold clamping apparatus according to claim 1,
wherein a pressure-bearing platen is moved by drive controlling a mold-thickness adjustment motor in a direction of eliminating the deviation, and the mold-thickness adjustment motor is stop controlled if the pressure-bearing platen is moved to a target position for eliminating the deviation.

8. The mold clamping force correction method for a mold clamping apparatus according to claim 1, wherein the mold clamping apparatus is provided with an injection molding machine.

* * * * *